Patented Apr. 28, 1953

2,636,807

UNITED STATES PATENT OFFICE 2,636,807

PURIFICATION OF CALCIUM CHLORIDE

John F. Ross, Shaker Heights, and Harold W. Sloyer, Willoughby, Ohio, assignors to General Electric Company, a corporation of New York No Drawing. Application October 9, 1951, Serial No. 250,564

2 Claims. (Cl. 23—99)

Our invention relates to the purification of chemicals, and particularly to the purification of calcium chloride for use in the preparation of fluorescent materials or phosphors.

In the preparation of fluorescent phosphors, it is necessary to employ materials which are low in iron and other heavy metals such as lead and copper. Calcium chloride is one of the basic materials used in the preparation of calcium phosphate and calcium carbonate which are employed in the manufacture of fluorescent halophosphates such as those disclosed in Patent 2,488,733, McKeag and Ranby.

Commercial calcium chloride is obtained from three main sources, namely, a by-product of the ammonia-soda process for making soda ash, a component of natural brines, and a product from the solution of lime with hydrochloric acid. The products may all contain iron and other heavy metals in varying proportions. The iron appears to be in two states of combination, namely, a type which can be precipitated in alkaline solution with hydrogen sulphide, and another variety of iron which is soluble under these same conditions.

It is an object of our invention, therefore, to provide a process whereby an inexpensive commercial grade of calcium chloride may be highly purified by a process which is simple but effective.

According to our invention, we obtain a calcium chloride solution substantially free of iron and other heavy metals such as lead, copper, etc., by neutralizing the slight alkalinity of the calcium chloride solution with dilute phosphoric acid to a pH of about 6.5, and filtering the resulting suspension. In this manner the total iron content can be reduced to 0.0001% or less, and the heavy metals can be controlled to 0.0005% or less, these values being based on the anhydrous calcium chloride contained in the solution. While we find that maximum effectiveness is obtained at an acidity of 6.5 pH units and we prefer to maintain it in the range of about 6.5±.05, this range may be varied when the indicated degree of purity is not required.

A specific example of the process according to our invention is as follows. Dissolve 37 kg. of calcium chloride dihydrate in 90 liters of water. Stir and slowly add about a 25% aqueous solution of phosphoric acid, making frequent checks with a pH meter until the pH of the solution is brought to 6.5. The quantity of phosphoric acid required will vary with the alkali present in the calcium chloride but it will usually require about 100 cc to make the adjustment. The resulting suspension is then filtered and the purified calcium chloride may be used in the preparation of calcium phosphate and carbonate employed in the manufacture of fluorescent halophosphates.

The halophosphate phosphors may be made by dry-mixing calcium fluoride together with calcium carbonate, calcium acid phosphate, manganese carbonate, antimony trioxide and calcium chloride. The mixture is throughly blended and fired at a temperature of the order of 1150° C. for a period of the order of an hour.

What we claim as new and desire to secure by Letters Patent of the United States is:

1. The method of treating slightly alkaline calcium chloride containing iron and heavy metal impurities which includes the steps of neutralizing the slight alkalinity of the calcium chloride solution by slowly adding dilute phosphoric acid thereto until the pH of the solution is brought to about 6.5, and then filtering the resulting suspension containing the insolubilized contaminants to thereby obtain the purified calcium chloride solution.

2. The method of treating slightly alkaline calcium chloride containing iron and heavy metal impurities which comprises making an aqueous solution of the calcium chloride in proportions corresponding approximately to 37 kg. of calcium chloride dihydrate in 90 liters of water, stirring the solution while adding about a 25% aqueous solution of phosphoric acid until the pH of the solution is brought to about 6.5, and then filtering the resulting suspension containing the insolubilized contaminants to thereby obtain the purified calcium chloride solution.

JOHN F. ROSS.
HAROLD W. SLOYER.

References Cited in the file of this patent

UNITED STATES PATENTS

| Number | Name | Date |
|---|---|---|
| 1,538,910 | Stokes | May 26, 1925 |
| 2,143,438 | Fox | Jan. 10, 1939 |

OTHER REFERENCES

Mellor: "Inorganic and Theoretical Chemistry," vol. 3, page 715, Longmans, Green and Co., N. Y.

Willard and Furman: "Elementary Quantitative Analysis," 1933 ed., pages 82, 83, D. Van Nostrand Co., Inc., New York.

"Catalog of Baker's Analyzed C. P. Chemicals and Acids," J. T. Baker Chemical Co., Phillipsburg. N. J., Jan. 1, 1935, ed., pages 10, 40.